(12) United States Patent
Ansari et al.

(10) Patent No.: US 8,819,821 B2
(45) Date of Patent: Aug. 26, 2014

(54) PROACTIVE TEST-BASED DIFFERENTIATION METHOD AND SYSTEM TO MITIGATE LOW RATE DOS ATTACKS

(71) Applicant: New Jersey Institute of Technology, Newark, NJ (US)

(72) Inventors: Nirwan Ansari, Montville, NJ (US); Amey Bhaskar Shevtekar, Harrison, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 13/729,435

(22) Filed: Dec. 28, 2012

(65) Prior Publication Data
US 2013/0212679 A1 Aug. 15, 2013

Related U.S. Application Data

(62) Division of application No. 12/127,235, filed on May 27, 2008, now Pat. No. 8,392,991.

(60) Provisional application No. 60/931,862, filed on May 25, 2007, provisional application No. 60/931,848, filed on May 25, 2007.

(51) Int. Cl.
*G06F 11/00* (2006.01)

(52) U.S. Cl.
USPC .................. 726/22; 726/23; 726/24; 726/25; 726/26; 726/3; 726/7; 726/11; 726/12; 726/13

(58) Field of Classification Search
CPC .............. H04L 29/06925; H04L 45/32; H04L 63/1458; H04L 2463/141; H04L 2463/142; H04L 2463/143; H04K 3/86; H04K 2203/20

USPC .................. 726/3, 7, 11–13, 22–25; 713/154; 370/360, 394
See application file for complete search history.

(56) References Cited

U.S. PATENT DOCUMENTS

| | | |
|---|---|---|
| 6,675,220 B1 | 1/2004 | Bergamasco et al. |
| 6,888,807 B2 | 5/2005 | Heller et al. |
| 7,020,783 B2 | 3/2006 | Vange et al. |
| 7,051,367 B1 | 5/2006 | Krishnaswamy et al. |
| 7,190,671 B2 | 3/2007 | D'Souza et al. |
| 7,266,754 B2 | 9/2007 | Shah et al. |
| 7,295,516 B1 | 11/2007 | Ye |

(Continued)

OTHER PUBLICATIONS

A. Kumar and J. Xu, "Sketch Guided Sampling—Using Online Estimates of Flow Size for Adaptive Data Collection", Proceedings of IEEE INFOCOM 2006, Barcelona, Spain, Apr. 2006.

(Continued)

*Primary Examiner* — Thanhnga B Truong

(57) ABSTRACT

A low rate DoS attack detection algorithm is used, which relies on a characteristic of the low rate DoS attack in introducing high rate traffic for short periods, and then uses a proactive test based differentiation technique to filter the attack packets. The proactive test defends against DDoS attacks and low rate DoS attacks which tend to ignore the normal operation of network protocols, but it also differentiates legitimate traffic from low rate DoS attack traffic instigated by botnets. It leverages on the conformity of legitimate flows, which obey the network protocols. It also differentiates legitimate connections by checking their responses to the proactive tests which include puzzles for distinguishing botnets from human users.

17 Claims, 14 Drawing Sheets

(56) References Cited

U.S. PATENT DOCUMENTS

| | | | |
|---|---|---|---|
| 7,370,357 B2 | 5/2008 | Sekar | |
| 7,603,711 B2 | 10/2009 | Scheidell | |
| 7,624,277 B1 | 11/2009 | Simard et al. | |
| 7,697,536 B2* | 4/2010 | Basso et al. ............... | 370/394 |
| 7,735,116 B1 | 6/2010 | Gauvin | |
| 2002/0035683 A1* | 3/2002 | Kaashoek et al. ............ | 713/154 |
| 2003/0161310 A1 | 8/2003 | Dobbins et al. | |
| 2004/0054925 A1 | 3/2004 | Etheridge et al. | |
| 2004/0257999 A1 | 12/2004 | MacIsaac | |
| 2006/0010389 A1 | 1/2006 | Rooney et al. | |
| 2006/0236402 A1 | 10/2006 | Russell et al. | |

OTHER PUBLICATIONS

A. Kumar, et al., "Space-Code Bloom Filter for Efficient Per-Flow Traffic Measurement", Proceedings of IEEE Infocom 2004, pp. 1762-1773, Hong Kong, Mar. 2004.

A. Kuzmanovic and E. Knightly, "Low-Rate TCP-Targeted Denial of Service Attacks (The Shrew vs. The Mice and Elephants)", Proceedings of ACM SIGCOMM 2003, pp. 75-86, Kalrushe, Germany, Aug. 2003.

A. Shevtekar and N. Ansari, "Do Low Rate DoS Attacks Affect QoS Sensitive VoIP Traffic?", Proceedings of IEEE ICC 2006, Istanbul, Turkey, Jun. 2006, pp. 2153-2158.

A. Shevtekar, et al., "Low Rate TCP Denial-of-Service Attack Detection at Edge Routers", IEEE Communication Letters, vol. 9, No. 4, pp. 363-365, Apr. 2005.

B. Stone, "A Lively Market, Legal and Not, for Software Bugs", New York Times, URL: http://www.nytimes.com/2007/0 1130/technology/3Obugs.html?ex=1327813200&en=99b34661ldilla278&ei=5088&partner=rssnyt&emc=rss, Jan. 30, 2007.

D. Dagon, et al., "Modeling Botnet Propagation Using Time Zones", Proceedings of NDSS 2006, San Diego, CA, Feb. 2006.

International Search Report and Written Opinion for PCT/US2008/064913, mailed Oct. 24, 2008.

Final Rejection on U.S. Appl. No. 12/127,235, mailed Jul. 20, 2012.

G. Appenzeller, et al., "Sizing Router Buffers", Proceedings of ACM SIGCOMM 2004, pp. 281-292, Portland, OR, Aug.-Sep. 2004.

G. Mori and J. Malik, "Recognizing Objects in Adversial Clutter—Breaking a Visual CAPTCHA", Proceedings of IEEE CVPR 2003, pp. 134-141, Madison, WI, Jun. 2003.

G. Yang, et al., "Randomization: Defense against Low-Rate TCP-targeted Denial-of-Service Attacks", proceedings IEEE Symposium on Computers and Communications, pp. 345-350, Alexandria, Egypt, Jun.-Jul. 2004.

H. J. Chao, et al., "CYSEP: a cyber-security processor for 10Gbps networks and beyond," Proceedings of IEEE MILCOM 2004, pp. 1114-1112, Monterey, CA, USA, Oct.-Nov. 2004.

H. Sun, et al., "Defending Against Low-rate TCP Attack: Dynamic Detection and Protection", Proceedings of IEEE Conference on Network Protocols (ICNP 2004), pp. 196-205, Berlin, Gennany, Oct. 2004.

International Preliminary Report on Patentability for PCT/US2008/064900, mailed Dec. 10, 2009.

International Preliminary Report on Patentability for PCT/US2008/064913, mailed Dec. 10, 2009.

K. Chandrayana and S. Kalyanaraman, "Uncooperative Congestion Control", Proceedings of the Joint International Conference on Measurement and Modeling of Computer Systems, pp. 258-269, New York, NY, Jun. 2004.

M. Fomenkov, et al., "Longitudinal Study of Internet Traffic from 1998-2003", Proceedings of the Winter International Symposium on Information and Communication Technologies, pp. 1-6, Cancun, Mexico, Jan. 2004.

M. Guirguis, et al., "Exploiting the Transients of Adaptation for RoQ Attacks on Internet Resources", Proceedings of IEEE ICNP 2004, pp. 184-195, Berlin, Germany, Oct. 2004.

Non-Final Office Action on U.S. Appl. No. 12/127,235, mailed Mar. 2, 2012.

Non-Final Office Action on U.S. Appl. No. 12/127,246, mailed Jan. 24, 2012.

Notice of Allowance on U.S. Appl. No. 12/127,235, mailed Oct. 1, 2012.

Notice of Allowance on U.S. Appl. No. 12/127,246, mailed May 10, 2012.

R. Beverly and S. Bauer, "The Spoofer Project: Inferring the Extent of Source Address Filtering on the Internet", Proceedings of USENIX SRUTI, pp. 53-59, Cambridge, MA, Jul. 2005.

R. Chertov, et al., "Emulation versus Simulation: A case study of TCP-Targeted Denial of Service Attacks", Proceedings of Tridentcom 2006, pp. 316-325, Barcelona, Spain, Mar. 2006.

R. Mahajan, et al., "Controlling High-Bandwidth Flows at the Congested Router", Proceedings of IEEE ICNP 2001, pp. 192-201, Riverside, CA, Nov. 2001.

S. Ebrahimi-Taghizadeh, et al., "TCP vs. TCP: a Systematic Study of Adverse Impact of Short-lived TCP Flows on Long-lived TCP Flows", Proceedings of IEEE INFOCOM 2005, pp. 926-937, Miami, FL, Mar. 2005.

S. Floyd and V. Jacobson, "Random Early Detection Gateways for Congestion Avoidance", IEEE/ACM Transactions on Networking, vol. 1, No. 4, pp. 397-413, Aug. 1993.

S. Kandula, et al., "Botz-4-Sale: Surviving Organized DDoS Attacks that Mimic Flash Crowds", Proceedings of USENIX NSDI, Boston, MA, May 2005.

S. Sarat and A. Terzis, "On the Effect of Router Buffer Sizes on Low-Rate Denial of Service Attacks", Proceedings of IEEE ICCCN 05, pp. 281-286, San Diego, CA, Oct. 2005.

The Coral Reef Software, URL: http://www.caida.org/tools/measurement/coralreef/status.xml, May 2008.

The OC48 Data, URL: http://www.caida.org/data/passive/index.xml#oc48, May 2008.

V. Paxon and M. Allman, "Computing TCP's Retransmission Timer", RFC 2988, Nov. 2000.

X. Luo and R. K. C. Chang, "On a New Class of Pulsing Denial-of-Service Attacks and the Defense", Proceedings of NDSS 2005, San Diego, CA, Feb. 2005.

Y. Chen, et al., "Collaborative Defense against Periodic Shrew DDoS Attacks in Frequency Domain", Technical Report, USC Internet and Grid Computing Lab (TR 2005-11), May 2005.

Y. Kwok, et al., "HAWK: Halting Anomaly with Weighted ChoKing to Rescue Well-Behaved TCP Sessions from Shrew DoS Attacks", Technical Report, USC Internet and Grid Computing Lab (TR 2005-5), Feb. 2005.

Y. Xu and R. Guerin, "On the Robustness of Router-based Denial-of-Service (DoS) Defense Systems", ACM Computer Communications Review, pp. 47-60, Jul. 2005.

Z. Gao and N. Ansari, "Differentiating Malicious DDoS Attack Traffic from Normal TCP Flows by Proactive Tests", IEEE Communication Letters, vol. 10, No. 11, pp. 793-795, Nov. 2006.

\* cited by examiner

If Low Rate DoS Attack detected, turn ON PTDT.

1) For all the expired flows with $k$ packets in each flow in the persistent storage, $C$ as the link capacity, and $P$ as the minimum packet size,
   If $\{0<k<C/P$, & createdtime>current time − 1s, & lastaccessedtime < current time$\}$,
   SUM = SUM + Totbytecnt/flow.
2) If SUM > THRESHOLD, Low Rate DoS Attack Detected.

PROACTIVE TEST-BASED DIFFERENTIATION METHOD AND SYSTEM TO MITIGATE LOW RATE DOS ATTACKS

CROSS REFERENCE TO RELATED APPLICATIONS

This application is a Divisional of U.S. application Ser. No. 12/127,235, filed May 27, 2008, which claims the benefit of U.S. Provisional Application 60/931,862 entitled "Novel Scalable Method and Technique to Mitigate Low Rate DoS Attacks" filed May 25, 2007, and U.S. Provisional Application 60/931,848 entitled "Novel Proactive Test Based Differentiation Method and System to Mitigate Low Rate DoS Attacks," also filed May 25, 2007, the contents of which are herein incorporated in their entirety.

FIELD

The present disclosure relates to the field of packet network security. More particularly, it relates to the detection and mitigation of Denial of Service (DoS) attacks, Distributed Denial of Service (DDoS) attacks, and Reduction of Quality (RoQ) attacks carried out over packet networks using one or more protocols from the Internet Protocol suite. More specifically, the disclosure describes a method including, but not limited to: a) detecting DoS and/or DDoS attacks, b) initiating a mitigation system in response to the attack, and c) mitigating the attack by both validating the remote user/computer and filtering out attack packets so that normal communication can continue. The disclosure describes a method that offers the significant advantages of effectively detecting and mitigating low rate DoS and/or low rate DDoS attacks and/or RoQ attacks against interactive servers. It provides a method which can detect the attack traffic and then differentiate legitimate TCP traffic by using proactive tests. Legitimate TCP traffic is subsequently allowed to access the network.

BACKGROUND

The Internet has been plagued by a variety of security threats over the past several years. The security menace on the Internet is exacerbated as more professionals are getting into this lucrative business. Attacks are also getting more sophisticated, as the attackers are not merely interested in achieving publicity. The low rate TCP Denial of Service (DoS) attack is one such intelligent attack, which was first explained in A. Kuzmanovic and E. Knightly, "Low-Rate TCP—Targeted Denial of Service Attacks (The Shrew vs. the Mice and Elephants)," Proceedings of ACM SIGCOMM 2003, Kalrushe, Germany, August 2003, pp. 75-86. A low rate DoS attack is typically illustrated by a periodic waveform shown in FIG. 1. T is the time period, t is burst period, and R is the burst rate.

A low rate TCP DoS attack exploits widely implemented minimum RTO (retransmission timeout) property of the TCP protocol. The following characterize a low rate TCP DoS attack:

It sends periodic bursts of packets at one-second intervals.
The burst rate is equal to or greater than the bottleneck capacity.
The burst period is tuned to be equal to the round-trip times of the TCP connections. The burst period determines whether the attack will cause DoS to the TCP connections with small or long round trip times.
The exponential back off algorithm of the TCP's retransmission mechanism is eventually exploited.

In a Reduction of Quality (RoQ) attack, the attacker sends high rate short bursts of the attack traffic at random time periods, thereby forcing the adaptive TCP traffic to back-off due to the temporary congestion caused by the attack bursts. In particular, the periodicity is not well defined in a RoQ attack, thus allowing the attacker to keep the average rate of the attack traffic low to evade the regulation of adaptive queue management (AQM) like random early detection (RED) and RED-PD (Preferential Dropping). RED detects congestion at early stages by monitoring the average queue length. RED-PD is another AQM scheme that regulates the long-lived flows, which occupy most of the bandwidth in the Internet. By sending the attack traffic, the RoQ attack introduces transients and restricts the router queue from reaching the steady state. The open knowledge of these stealthy attacks presses for early fixes. For simplicity, the term "low rate DoS attack" refers to both the low rate TCP DoS and RoQ attacks, unless otherwise stated.

The threat imposed by the low rate DoS attacks which use IP address spoofing, and the low rate DoS attack model using botnets is significant. Owing to the open nature of the Internet, IP address spoofing can still evade ingress and egress filtering techniques at many sites. A low rate DoS attack can use IP address spoofing in a variety of ways like random IP address spoofing and continuous IP address spoofing. The use of IP address spoofing most importantly divides the high rate of a single flow during the burst period of the attack among multiple flows with spoofed identities. This way, an attacker can evade detection systems that concentrate on finding anomalous traffic rate. The detection systems that rely on identifying periodicity of the low rate DoS attack in the frequency domain can detect the periodicity, but they fail to filter the attack traffic as it is difficult to know the IP addresses that an attacker will use in the future. This problem is further exacerbated by the use of botnets; a botnet is a network of compromised real hosts across the Internet controlled by a master. As an attacker using botnets can control thousands of hosts, it can easily use these hosts to launch a low rate DoS attack like a low rate DoS attack that uses random or continuous IP address spoofing. Now, with the use of botnets, the IP addresses (of compromised hosts) are not spoofed and so these packets cannot be filtered by spoofing prevention techniques. In fact, these attack packets are similar to the HTTP flows. Thus, the objective is to detect a low rate DoS attack that can deploy different IP address spoofing techniques, and then filter the attack traffic. In a low rate DoS attack, an attacker usually targets the network element which is a router. The low rate DoS attacks launched by using botnets can behave like normal connections and can go undetected by prior systems which can, however, be used to regulate and limit both the legitimate and attack traffic. These attacks are similar to the low rate DoS attacks that use continuous IP address spoofing. The possibility of an attacker using UDP packets to launch a low rate DoS attack always exists, and prior systems do not provide a provision to mitigate such threat from UDP packets. An attacker can use aggregate UDP traffic coming from many networks to launch a low rate DoS attack. There is a need to detect and mitigate these problems and related issues.

SUMMARY

Briefly, in accordance with at least one embodiment, a methodology is described that provides low rate DoS attack detection and mitigation. It is a method which can detect the attack traffic and then differentiate legitimate TCP traffic by using proactive tests. The legitimate TCP traffic is subsequently allowed to access the network.

Another embodiment of the algorithm defends against different types of IP address spoofing that have evaded other detection systems. The embodiment includes a method of providing an effective defense against the low rate DoS attacks to the networks that, in particular, host web-servers; web traffic is one of the dominant traffic in the Internet.

Yet another embodiment is a proactive test based differentiation technique (PTDT) to mitigate Distributed Denial of Service (DDoS) packet floods combined with a low rate DoS attack detection algorithm to mitigate the threat by low rate DoS attacks. PTDT differentiates clients who obey the standard protocols (i.e., legitimate) from those who do not (i.e., not legitimate) by proactive tests to each flow over a period of time to test. Based on the calculated flow rate, it also computes the probability of each flow being subject to proactive tests. In at least one embodiment, for attacks which employ source IP address and destination IP address spoofing, the low rate DoS attack detection algorithm relies on detecting the sudden increase in the traffic load of all the expired flows within a short period. This embodiment combines the PTDT probability results with the low rate DoS attack detection algorithm to mitigate the threat by multiple types of low rate DoS attacks.

Yet still another embodiment of the PTDT sends a puzzle to the source of new flows to distinguish humans from attack machines by requiring a valid response to the puzzle for flow validation. One embodiment of this employs visual puzzles known as CAPTCHAs (Completely Automated Public Turing Test to Tell Computers and Humans Apart) which are presented to the new connections in order to separate zombies or infected machines from humans accessing the web server. In this way, the proactive tests serve to verify the adaptive behavior of the legitimate TCP protocol. In another embodiment, the low rate DoS attack detection algorithm relies on the key characteristic of internet traffic volume composition, being that 30-40% of the traffic volume in the Internet is contributed by short lived flows. Low rate DoS attacks under consideration in this disclosure generate short-lived flows, and this feature is used to create a more efficient detection system

BRIEF DESCRIPTION OF THE DRAWINGS

To assist those of ordinary skill in the relevant art in making and using the subject matter hereof, reference is made to the appended drawings, wherein:

FIG. 6(*b*) is an exemplary illustration of TCP goodput and TCP throughput for the TCP flow and UDP throughput with the traffic classification policy.

FIG. 8(*b*) are exemplary experimental results showing the throughput of the attack traffic using TCP smart sink in embodiments of BTD.

DETAILED DESCRIPTION

Figure 1:
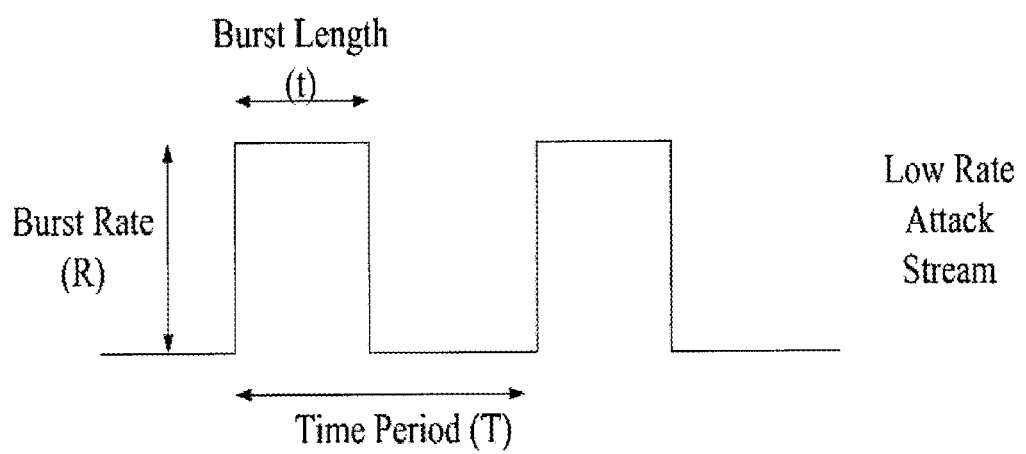
FIG. 1 is a generic example of a low rate DoS attack pattern.
Figure 2:
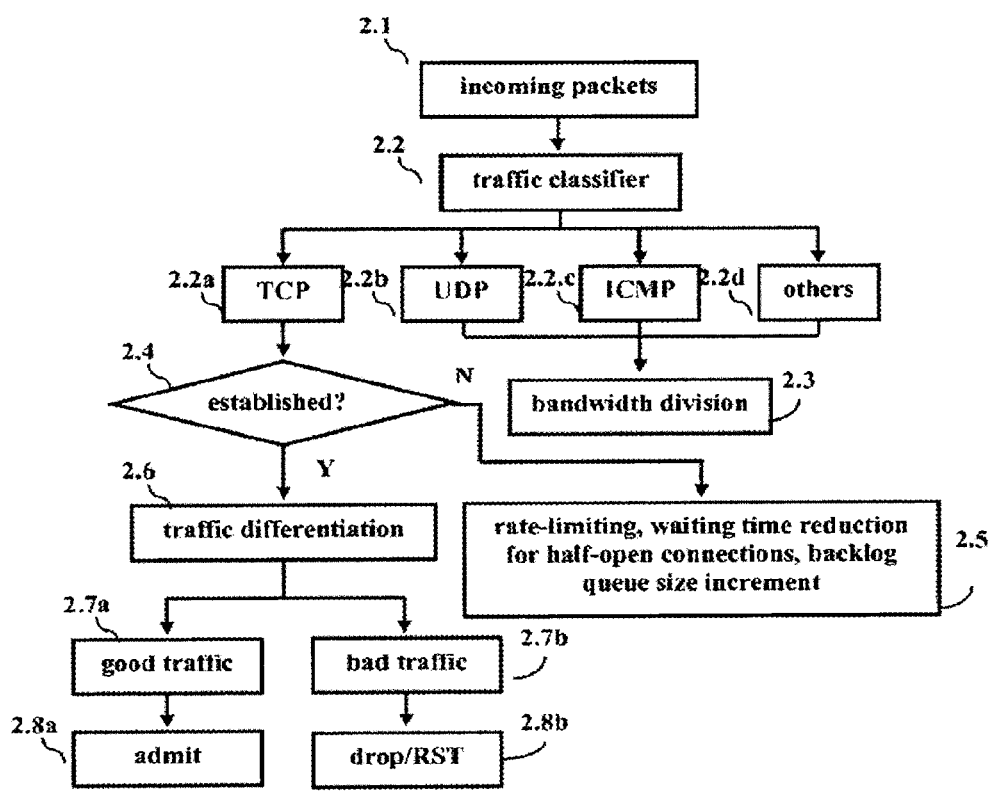
FIG. 2 depicts an exemplary flowchart of an embodiment of a behavior-based traffic differentiation (BTD) framework.

FIG. 2 depicts a flowchart of exemplary operations of a behavior-based traffic differentiation (BTD) framework to isolate attack traffic and contain Distributed Denial of Service (DDoS) attack schemes. In operation 2.1 of FIG. 2, incoming packets are received by the BTD framework. At operation 2.2 a method for traffic classification is implemented. operation 2.3 implements a method of bandwidth division/allocation. In operation 2.4, a determination of whether the TCP connection has been established is made. If the TCP connection has not been established, at least one of rate limiting; waiting time reduction for half-open connections; and incrementing backlog queue size are performed in operation 2.5. Alternatively, if the TCP connection has been established a method for traffic differentiation is performed in operation 2.6.

As the result of the method for traffic differentiation, a determination is made of whether the packet is normal traffic or attack traffic in operation 2.7(*a*) and operation 2.7(*b*), respectively. If it is determined in operation 2.7(*a*) that normal traffic is being received, the received packet is admitted by the BTD framework in operation 2.8(*a*). Alternatively, if it is determined in operation 2.7(*b*) that attack traffic is being received, the received packet is dropped and denied admission by the BTD framework in operation 2.8(*b*). For a heavily loaded receiver (e.g., a server) that serves a huge amount of packets from disparate sources, embodiments of BTD shall make a fast and smart decision to admit or drop an incoming packet. The ever-increasing link-speed is motivation to contrive countermeasures at the flow level.

The methods for traffic classification and bandwidth allocation are further discussed in the following paragraphs. In particular, methods for traffic classification in embodiments of BTD are discussed in the following. Since, as discussed above, UDP lacks built-in congestion control mechanisms and is aggressive in nature, embodiments of BTD first classify traffic based on protocols to isolate TCP and non-TCP traffic. Specifically, embodiments of BTD classify traffic into 4 groups: TCP, UDP, ICMP, and other. Embodiments of BTD implement this classification at least by checking the protocol field at the IP layer. Regarding bandwidth division/allocation, as a non-limiting example, a system administrator may configure its network and assign the bandwidth in the following way: TCP: 85%, UDP: 13%, ICMP 1%, and others 1%. This specific configuration is determined by the site's profile, and may be changed dynamically.

A goal of the method of traffic classification of embodiments of BTD is to determine, according to normal traffic profiles, whether it is necessary to implement a defense to mitigate the impact of possible UDP and ICMP flood attacks. Unlike TCP traffic, whose property may be identified according to its behavior, UDP is aggressive in nature. As a less "reliable" protocol, it turns out that no easy way may be taken to distinguish between normal UDP traffic and attack UDP traffic. However, by imposing a bandwidth limit, embodiments of BTD provide a simple but effective strategy to distinguish between the two and does not affect the network performance in most cases.

In addition, limiting the amount of ICMP traffic allowed into a network is a good practice because it is used solely for diagnostic purpose and ICMP-based DDoS attack are common.

Figure 3:
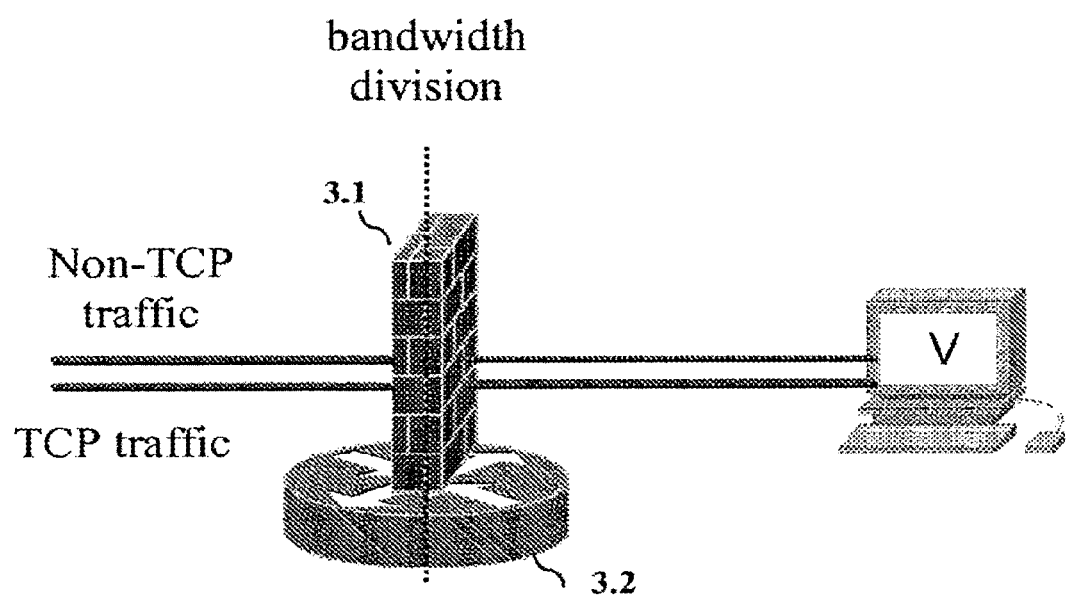
FIG. 3 is an exemplary illustration showing how traffic classification may be implemented at the entry point of the protected networks or systems at either a firewall or an edge router.

FIG. 3 shows how traffic classification may be implemented at the entry point of protected networks or systems, either at a firewall 3.1 or an edge router 3.2. The availability of network processors and other ASICs specifically designed for classification renders it possible for embodiments of BTD to be operated at line rate.

In considering the bandwidth allocation/division function of embodiments of BTD, the quota for each protocol is configurable and it is normally determined by the routine traffic profile at one site. As discussed above and in accordance with recent measurements, the dominant traffic in the current Internet is still TCP. Thus, it is reasonable to assign most of the bandwidth to TCP traffic for a normal site because most killer applications such as web, email, telnet, and FTP all use TCP. For example, a possible bandwidth allocation/division among different protocols is TCP: 88%, UDP: 10%, ICMP: 1%, and other: 1%. In case of a traffic pattern change in the future, what embodiments of BTD provide is a variable bandwidth allocation that is able to adjust the bandwidth allocation percentage according to the new traffic model, and thus, embodiments of BTD can be tailored for future traffic changes.

The method of TCP flow differentiation in embodiments of BTD is discussed in the following paragraphs. Connection establishment determines whether or not a connection has been established and means a lot to the receiver. A successfully established connection indicates that both ends have completed the three-way handshaking procedure.

Another determination in DDoS defense is whether or not IP spoofing is being used by the source. For an incomplete connection, on the other hand, the receiver shall be alert, and be conservative in its resource consumption. Possible measures to mitigate potential attacks include, but are not limited to: (1) tightening the total bandwidth allocation to all incomplete connections; (2) significantly reducing the timeout value to avoid buffers occupied by half-open connections for a long time, or providing no buffer allocation at all for half-open connections; and (3) increasing the buffer size for backlogs. These options are shown in FIG. 2 at operation 2.5 and discussed above.

Analyzing normal or benign flows and lethal or attack flows are discussed in the following. After assigning the quota for each protocol, the next task is to isolate lethal or attack TCP flows from benign or normal TCP flows. This is done simply because TCP consumes most of the bandwidth of the protected network. As mentioned earlier, straightforwardly adopting fair packet queuing is impractical in case of flood-based DDoS attacks when a large majority of traffic is attack streams. TCP is an end-to-end solution that requires close orchestration between the sender and the receiver. To identify the nature of a TCP flow (i.e., after a successful connection), the receiver can actively test the response of the sender by delaying the ACK packets intentionally. If the sender is normal, it will take action accordingly and reduce its sending rate.

On the contrary, for a DDoS attack, two cases may occur. One is that the sender uses forged source IP addresses, and thus cannot receive the rate-reduction message from the receiver. It has no idea of the proper sending rate. The other scenario is that the sender does receive the notification, but it neglects it and just keeps sending packets, thus violating the protocol, and it may be punished by the recipient to reduce its share or even block its traffic. This procedure is dynamic. The protected site can decide the frequency and extent of rate-reduction so that no perpetrator can easily fool the system to believe that the traffic from the perpetrator is normal.

Figure 4:
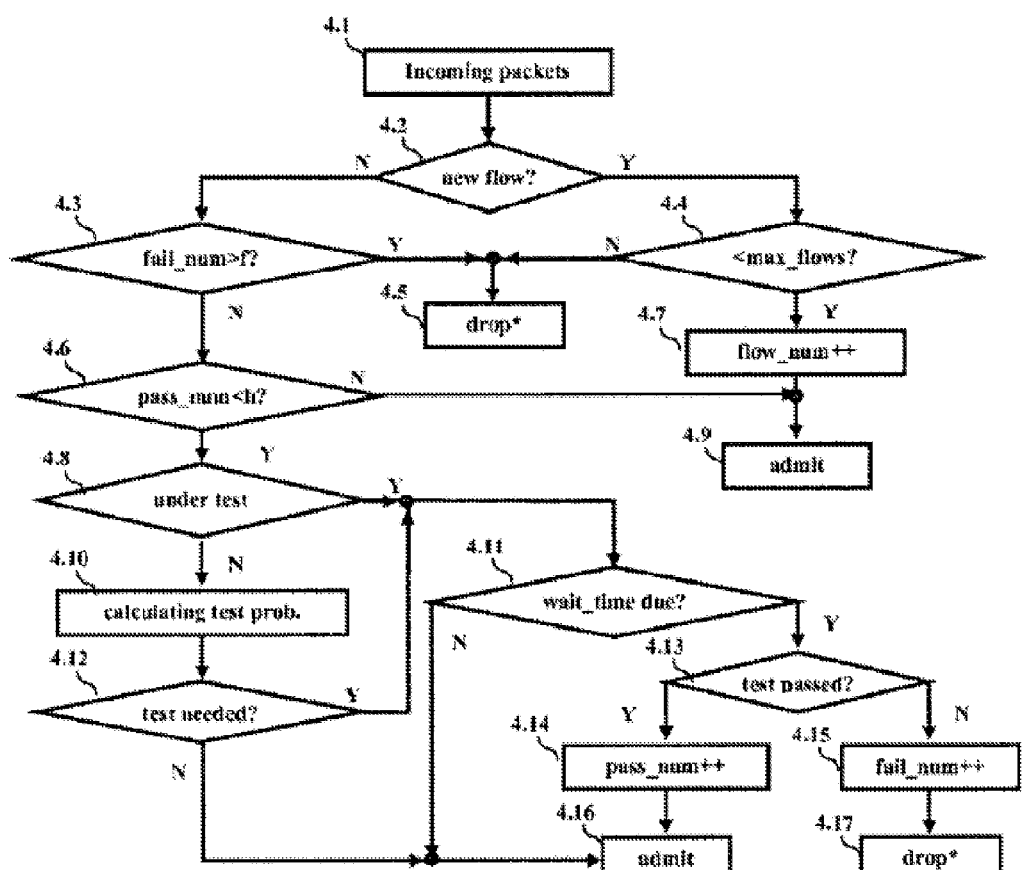
FIG. 4 is an exemplary flowchart for a method for traffic differentiation in embodiments of the BTD of FIG. 2.

FIG. 4 depicts an exemplary flowchart of operations in a method for traffic differentiation in embodiments of BTD. Upon the arrival of a new incoming packet at operation 4.1, the receiver first determines where the flow of the current packet belongs by checking the tuple of (source IP address, source port number, destination IP address, destination port number) also in operation 4.1 of FIG. 4. In operation 4.2, if the method determines the packet is the first packet of a new flow, the receiver examines whether the number of admitted flows reaches the maximal flow count in operation 4.3 relative to a threshold set by the receiver to ensure provisioning of proper quality of service. If the maximal flow count does occur, the packet is dropped in operation 4.5. Otherwise, after updating the flow table maintained by the receiver, incrementing the flow count by 1, and initializing several counters, such as the number of successful tests and the number of failure tests in operation 4.7, the new packet is admitted in operation 4.9.

For the packet of an existing flow, the receiver checks the behavior history of the flow. In operation 4.3 of FIG. 4, if the number of failure tests is no less than a threshold, f, and the packet will be dropped in operation 4.5. An integer larger than 1 is selected to prevent embodiments of BTD from falsely identifying the behavior of a flow. A low value of f may exacerbate packet dropping. In case of a false identification, subsequent packets from an innocent flow will be blocked. Selecting a too high value is unwise, either. A high f delays the packet dropping decision, and thus subsequent packets of a malicious stream may still consume system resources. Experimental results indicate that f=3 provide a good balance between the proper identification rate and the acceptable performance impact.

In addition, it is worth mentioning that a receiver has a couple of options to choose to punish the source at this point. One option is to send DUPACK on purpose forcing the source into the stage of slow start. Another is to send RST (reset) to halt the connection so that its resource is not wasted by the misbehaving sources. In FIG. 4, only the operation of packet dropping is shown without any further punishment.

For the flow whose behavior is not so bad in the past, embodiments of BTD further examine whether the flow has passed a certain number of tests, h as shown in Step 4.6 of FIG. 4. The receiver will admit directly any packet of flows having passed h tests successfully (e.g., some tradeoff has to be made to determine a proper value of h. Selecting a high h value may hurt the performance of a good but high rate flow, while the tests may be easily evaded by sophisticated attackers using a low value. In operation 4.6, h is set to 6 after extensive simulations).

For other flows, embodiments of BTD further check the current state of the flow in operation 4.8 of FIG. 4. If the flow is under a test, its current rate shall not exceed one half of its previous one (i.e., the receiver enforces this constraint by manipulating the reverse ACK rate). If the flow conforms to that constraint, the flow passes the current test in operation 4.13; the pass_num is incremented by 1 in operation 4.14; and the packet is admitted in operation 4.16. Otherwise, the flow fails one test in operation 4.13; the fail_num is incremented by 1 in operation 4.15; and the packet is dropped in operation 4.17.

In the case that operation 4.8 determines the flow is not in the state of testing, its sending rate is compared with that of the fair share of each flow. The result of the comparison is used to determine the test probability for that flow in operation 4.10. Operation 4.12 determines whether a test is needed. Obviously, a flow with a smaller bandwidth assumption is subject to a smaller number of tests. Operation 4.1 determines the waiting time between tests. The test probability p for a high-rate flow (over the faire share) is 1/(pass_num+1). At the very beginning, pass_num is 0 for all flows. Therefore, as long as a high-rate flow has not passed a test, its chance of being tested is 100%.

As the number of successful tests of a flow increases, its test probability reduces. The test probability p for less resource-consumption flow is 1/max(m,2*h), where m is the total number of flows. For the normal case, m>>2h; thus, p=1/m. The max(.) function is used to address the case that only a few flows exist in the system and ensure that the test probability for a low-rate flow is at most ½ of that of a high-rate one.

The rate of a flow is calculated according to the following formula, $$(num\_pkt * sz\_pkt)/t, \quad (1)$$

where t is the time interval (window), num_pkt is the number of packets received during this period, sz_pkt the packet size. It is worth mentioning that the flow rate calculated here is not the average rate of a flow, as normally used by others, because the starting time of a flow is updated once it passes a test. In so doing, it is possible to thwart a low-rate DoS attack which sends a burst of attack packets to incite congestion and keeps silent for a much longer period to significantly lower its average rate in order to escape detection and filtering.

By way of example, four scenarios may happen. In a scenario (1), an attack source always behaves well, and thus the effect of an attack is greatly diminished. In a scenario (2), an attack source behaves well at first and misbehaves later. In this case, the constraint that the current rate is at most ½ of previous rate upon the test state will not be satisfied, and the source fails the test. In a scenario (3), an attack source always misbehaves, that may be easily thwarted by the fail count. In a scenario (4), an attack source misbehaves at first and behaves well later. For scenario (4), the attack source is exposed to more chances of being tested because its pass_num is offset by the fail_num once it fails a test. It is noted that a low-rate flow is also subject to test, though at a lower probability in the exemplary design. As time passes by, the chance that a low-rate flow has never been tested by the receiver is very low. Embodiments of BTD enforce this policy to contain the case that some low-rate streams are malicious.

A penalty for bad TCP flows is discussed in the following. A receiver has a couple of options to choose to punish the source. One option is to send DUPACK on purpose, thus forcing the source into the stage of slow start. Another is to send RST to halt the connection so that its resource is not wasted by the misbehaving sources. Embodiments of BTD send RST once the flow fails the tests 3 times. In FIG. 4, the operation of packet dropping is shown without any further punishment.

Figure 5:
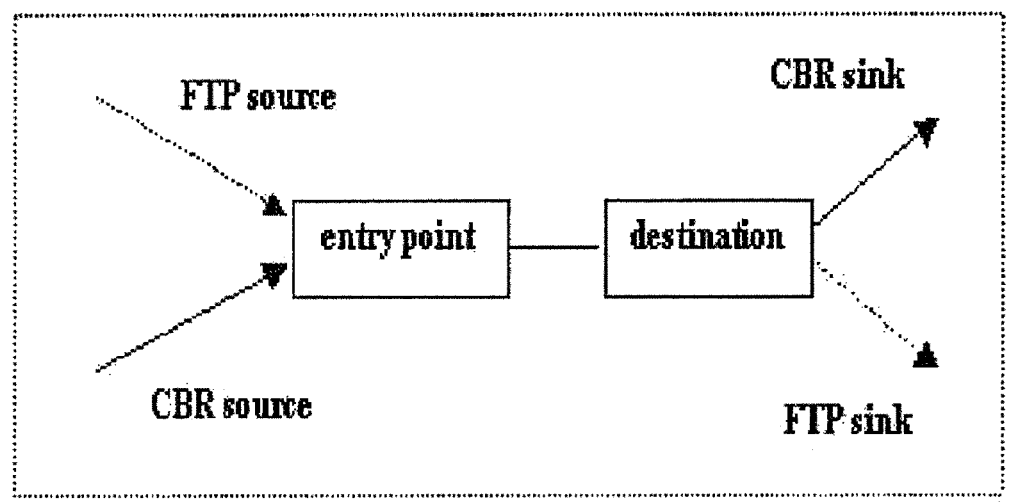
FIG. 5 illustrates an exemplary simulation scenario including one FTP source and sink (using TCP), and one CBR source and sink (using UDP).

Experimental results regarding traffic classification are discussed below. To test the effectiveness of traffic classification, a simulation scenario was set up including 1 FTP source and sink (using TCP), and 1 CBR source and sink (using UDP), as shown in FIG. 5. These flows pass through the same bottleneck link. The link parameters between the FTP source and the checking point, the CBR source to the checking point, destination and CBR sink, and destination and FTP sink are all 10 Mb in bandwidth, and 2 ms in delay. The bottleneck link between the checking point and the destination is set to be 1 Mb and 10 ms. The CBR rate is 10 Mb. The traffic classification for TCP is 90%, and UDP 10% at the checking point. In the comparison of simulations, everything is the same except whether the entry point enforces traffic classification or not. The throughput of the FTP traffic is presented in FIG. 6(a) and FIG. 6(b).

Figure 6A:
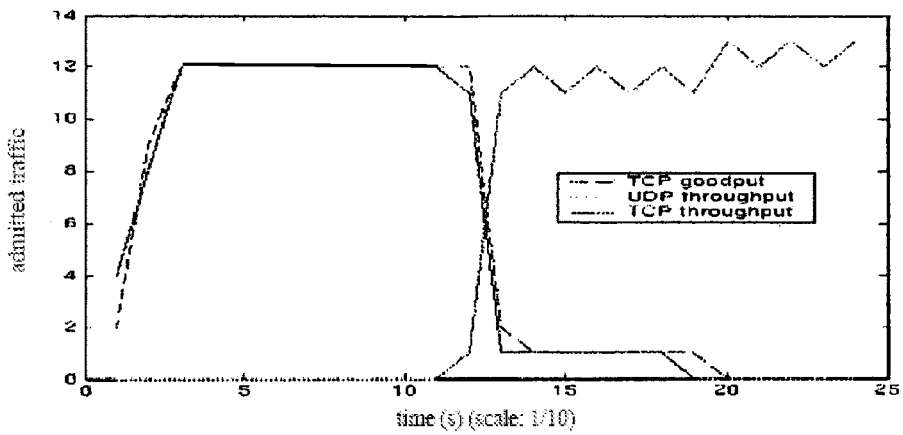
FIG. 6(*a*) is an exemplary illustration of TCP goodput and TCP throughput for the TCP flow and UDP throughput without the traffic classification policy.
Figure 6B:
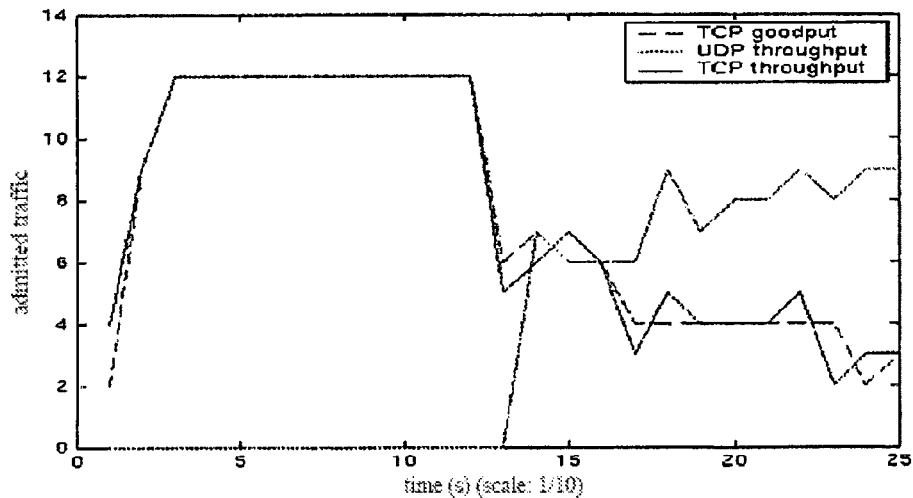

FIG. 6(a) depicts TCP goodput and TCP throughput for the TCP flow and UDP throughput without the traffic classification policy. In FIG. 6(a) and FIG. 6(b), TCP traffic starts at time 0 seconds and UDP traffic begins 1 second later. During 0-1 seconds, TCP is the only traffic in the link and its goodput and throughput reaches 12 packets per 0.1 s, the maximal value (the bandwidth of the bottleneck link is 1 mb/seconds, each packet is 1000*8=8000 bits, 1 mb*0.1/8000=12). From 1.2 seconds on, UDP traffic starts to merge and it captures the available bandwidth so fast that TCP throughput reduces to 1 packet during 1.3-1.8 seconds, starving since 1.9 seconds. With traffic classification, in contrast, TCP throughput remains 3 packets per 0.1 seconds even after 1.9 seconds, while UDP traffic is no more than 9 packets per 0.1 seconds. The total number of packets sent is 127 in FIG. 6(a), 234 in FIG. 6(b) (the throughput is only depicted until 1.9 seconds in FIG. 6(b) for comparison). Therefore, the throughput of TCP traffic is increased by 70.8% with traffic classification. Though UDP traffic still seizes more share than TCP, as explained above, this is due to the built-in congestion control mechanism of TCP.

Figure 7:
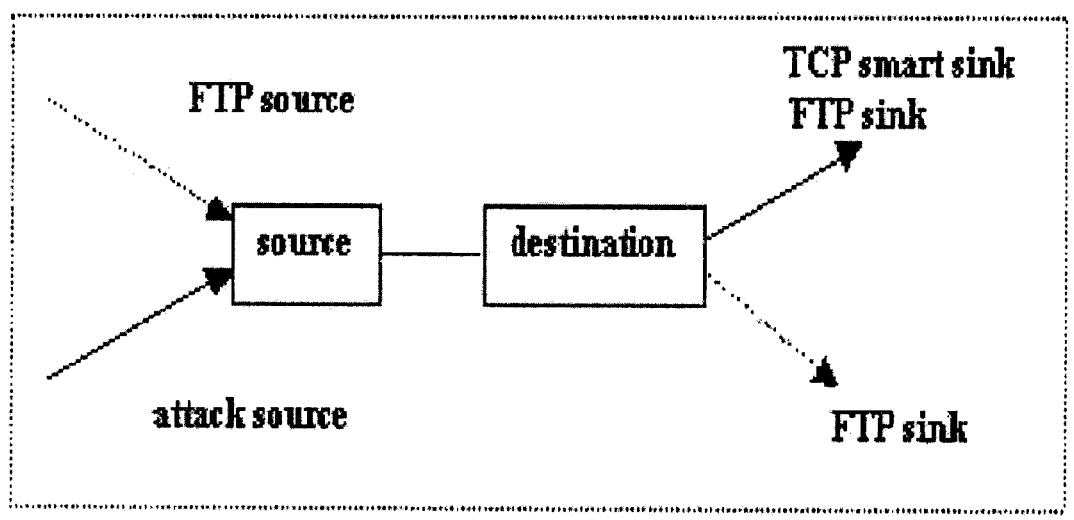
FIG. 7 illustrates exemplary experimental results showing the effectiveness of traffic differentiation in a simulation scenario including one FTP source and an attack source.

The following discusses TCP flow differentiation. To test the effectiveness of traffic flow differentiation, a simulation scenario including an FTP source and an attack source was set up, as shown in FIG. 7. These flows pass through the same bottleneck link. The difference is that one simulation uses a normal FTP sink to accept packets from both flows, another uses a developed TCP sink, called TCP smart sink. The simulation results are shown in FIG. 8(a) and FIG. 8(b).

Figure 8A:
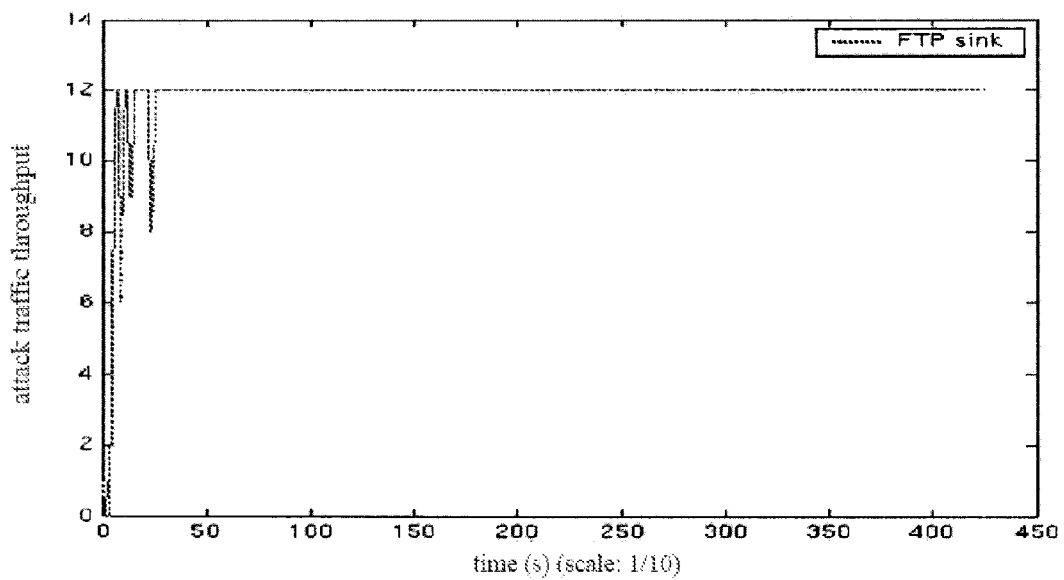
FIG. 8(*a*) are exemplary experimental results showing the throughput of the attack traffic using the FTP sink in embodiments of BTD.
Figure 8B:
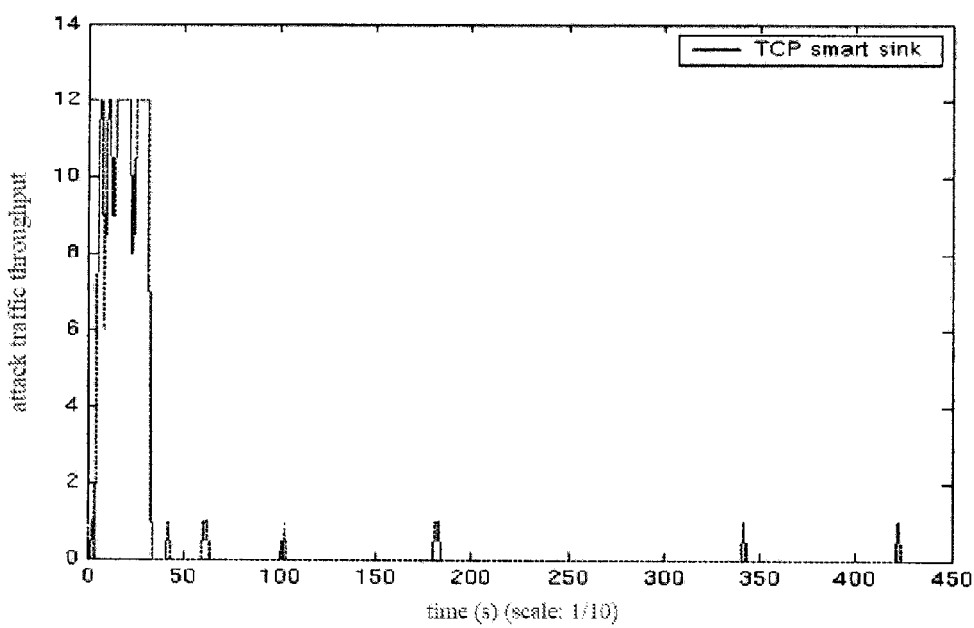

FIG. 8(a) shows the throughput of the attack traffic using the FTP sink while FIG. (8b) presents the throughput of the attack traffic using the TCP smart sink in embodiments of BTD. At 3.2 s, the throughput of attack traffic drops drastically. After 42.3 s, the attack traffic is totally blocked. In contrast, using the background art FTP sink as the receiver, the sender may keep the highest throughput during its lifetime. The result demonstrates the effectiveness of the traffic differentiation approach of embodiments of BTD.

As discussed above, exemplary BTD embodiments include at least two components: traffic classification and traffic differentiation. The former is used to reduce the volume of non-TCP traffic while the latter can identify malicious TCP flows via proactive tests. Some benefits of embodiments of BTD are listed as follows: BTD can effectively and efficiently identify and block attack flows via proactive tests; BTD can contain many DDoS attack patterns; BTD requires minimal modification; and BTD has no issues such as scalability and lack of incentives.

Simulation and the above-discussed experimental results have validated the design. In addition, the following are additional aspects of embodiments of BTD: (1) identifying the network condition automatically; (2) selecting various parameters used for proactive testing adaptively; and (3) implementing the framework in operating system environments such as, but not limited to a Linux kernel.

Figures 9, 10:
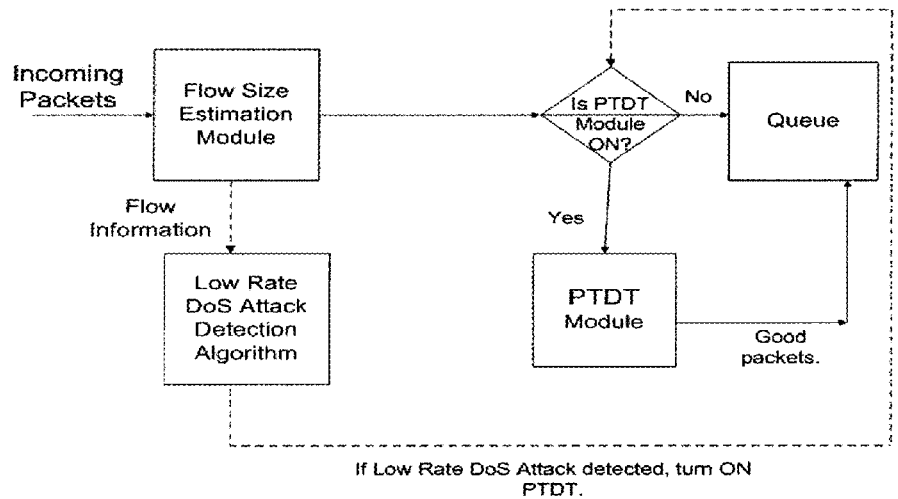
FIG. 9 is a detection system block diagram.
FIG. 10 is a low rate DoS attack detection algorithm.

An exemplary detection and mitigation system is shown in FIG. 9. In this embodiment, the detection and mitigation system operates at routers primarily at the edges of a network, so that all the traffic entering the network can be examined by the system. The low rate DoS attack detection algorithm requires the per flow information of the traffic passing through an edge router. A flow or flow id is defined as a 4-tuple of the source IP address, the source port, the destination IP address, and the destination IP port. The flow size estimation module provides the necessary per-flow information of the network traffic passing through the router to the low rate DoS attack detection algorithm. Incoming packets are enqueued in the outgoing queue of the router if the PTDT (proactive test-based differentiation technique) module is not ON. The PTDT module is activated if the low rate DoS attack detection algorithm detects a low rate DoS attack. Once activated, PTDT allows legitimate traffic to pass through the router, but blocks the attack traffic.

Two aspects of the system include the low rate DoS attack detection algorithm and the PTDT module. In one embodiment, the low rate DoS attack detection algorithm is based on the premise that the majority of short-lived flows in the Internet occupy only about 30% to 40% of the total volume of traffic, and the minority of long-lived flows occupy the remaining 60% to 70% of the total volume of traffic. The low rate DoS attack using IP address spoofing consists of many short-lived flows whose aggregate traffic rate for a short period of time is extremely high, thus violating the characteristics of the normal Internet traffic stated above. The attacker can use different forms of IP address spoofing like random IP address and continuous IP address spoofing. The flow information for each flow consists of the packet count (k), the packet size, the createdtime, and the lastaccessed time.

A. Low Rate DoS Attack Detection Algorithm

FIG. 10 shows an exemplary embodiment of the low rate DoS attack detection algorithm. In the figure, the totbytecnt/flow represents the number of bytes of traffic sent in each flow until lastaccessedtime, the SUM variable represents the total number of bytes of all expired flows, and the THRESHOLD variable is described in detail later. The algorithm computes the sum of totbytecnt/flow of all the flows that are expired in a short period of one second and checks whether the sum is greater than a threshold. If the sum is greater than the threshold, the low rate DoS attack is considered detected. Selecting the threshold is important in detecting a low rate DoS attack, which can keep the burst rate low. The following thresholds are possibilities:

$$\text{THRESHOLD} \geq C+B \quad \text{1)}$$

$$C/2+B \leq \text{THRESHOLD} < C+B \quad \text{2)}$$

$$C/4+B \leq \text{THRESHOLD} < C/2+B \quad \text{3)}$$

C is the capacity of the link, and B is the buffer size of the router. In at least one embodiment, the maximum possible is selected to be less than C/P where P is the minimum packet size. Thus, all the attack flows are considered by the detection algorithm, and the SUM value exceeds one of the proposed thresholds under the low rate DoS attack. The burst period of a low rate DoS attack in the literature is found to be less than one second, and one second is considered in the detection algorithm. Higher burst periods are considered in the results, but the attack is no longer a low rate DoS attack with higher burst period. A higher burst period low rate DoS attack can be detected by RED-PD. Thus, the algorithm can successfully detect a low rate DoS attack that uses IP address spoofing.

B. Proactive Test Based Differentiation Technique Module

Figure 11:
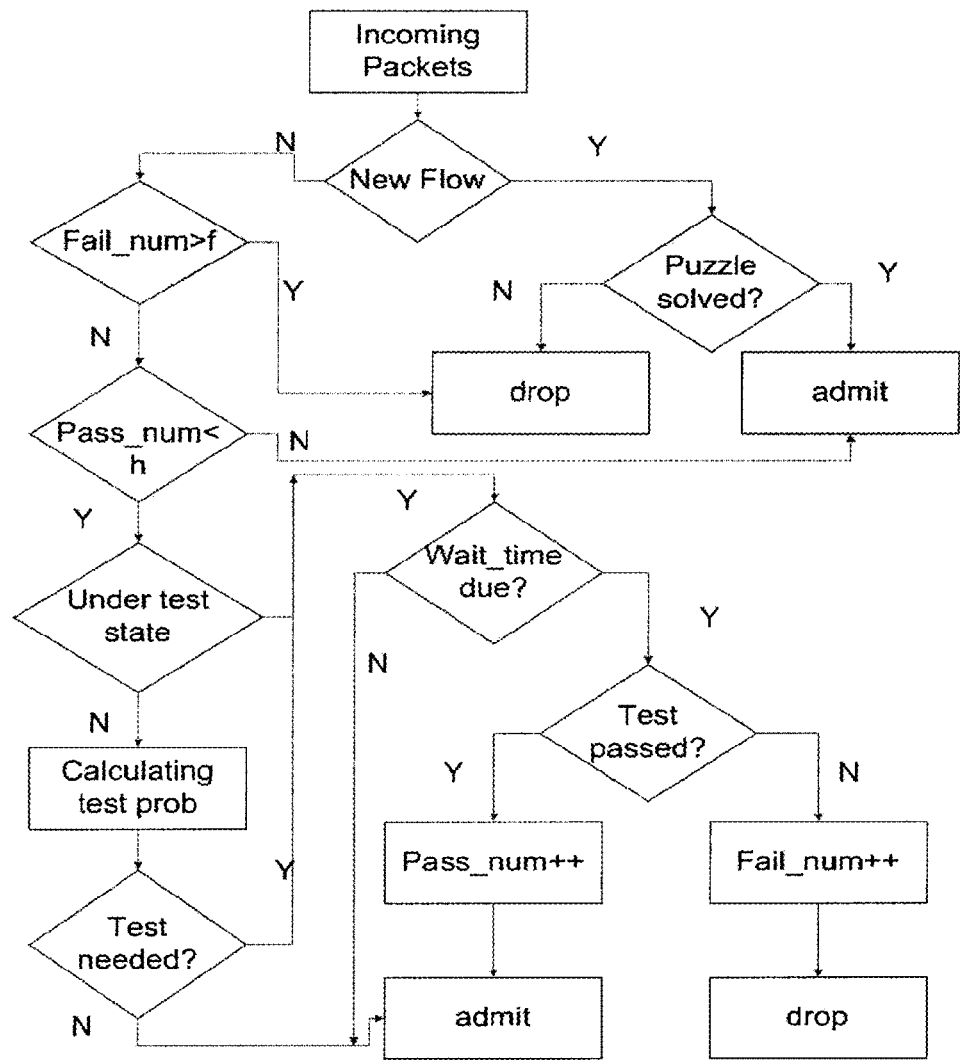
FIG. 11 is flowchart of a proactive test based differentiation technique (PTDT) module.

For at least one embodiment, the role of PTDT is shown in FIG. 9. After the low rate DoS attack is detected, PTDT is activated. The PTDT also leverages on the fact that TCP traffic is dominant in the Internet. FIG. 11 shows a flowchart of the PTDT module. On arrival of a SYN (synchronize) packet, the PTDT module knows the packet belongs to a new flow and sends a puzzle to the source of the packet. The user is admitted by the system after having given the correct answer of the puzzle. This way, the PTDT can stop an attacker who can send SYN packets to launch a low rate DoS attack, and still allow the legitimate users to access the network. The technique of introducing a puzzle also confirms that a human user, rather than an automated attack machine, is initiating the communications, and so the flow after having been admitted to the system will follow the standard protocol. The remaining operations in the flowchart verify the behavior of the flow over a period of time before being classified as benign.

The two counters fail_num and pass_num achieve a balance between the conservative and aggressive approach against individual flows. A flow is allowed to prove its innocence by failing no more than a certain number of tests maintained by the fail_num counter; otherwise, it is dropped. Similarly, a good flow after having passed a certain number of tests maintained by the pass_num counter is trusted as innocent, and is not required to take further tests. Then, the PTDT module checks the current state of the flow; for a flow under test, its current rate should not exceed its previous rate. This can be achieved by dropping a single data packet, so that the legitimate TCP flow reduces its sending rate. The attack flows do not reduce their rates, and thus can be distinguished. If a flow passes this test, its pass_num value is increased by one, and vice versa. The default values of various thresholds like certain numbers of tests that can be failed, though are applications specific. Another advantage of using these proactive tests is to detect intelligent attackers who can overcome CAPTCHAs by using intelligent image recognition softwares.

Thus, by employing the PTDT module in this embodiment, the legitimate TCP traffic can still access the network in the presence of the low rate DoS attack. The PTDT module can also monitor the rates of some common UDP applications like VoIP and Video traffic, and if the rates conform to the standard application rates, then these flows can also be admitted into the network.

At least one embodiment implements the proposed detection system at high speeds. As network security is becoming more important, advances in hardware technologies are critical to support complex operations at high speeds. Exemplary embodiments need per flow information for the low rate DoS attack detection algorithm, and per flow processing for the PTDT module. Prior systems tune the sampling frequency of Internet traffic such that an accurate estimate of both long-lived and short-lived flows can be made. They alleviate the common drawback of the uniform sampling, which only provides the information of the long-lived flows in the Internet, i.e., the dominant traffic at both the byte-level and packet-level. In some exemplary embodiments, the entire detection system can work at network edges where such tasks can be performed by using a combination of different hardware implementations. Various embodiments can be suitable for medium and small-sized networks, which host web servers.

Figure 12:
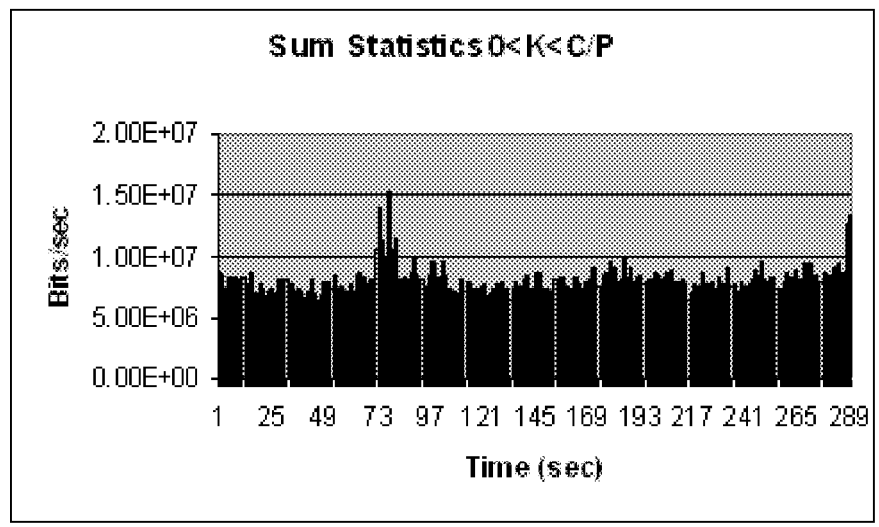
FIG. 12 is a graphic representation of sum statistics for every second.
Figure 13:
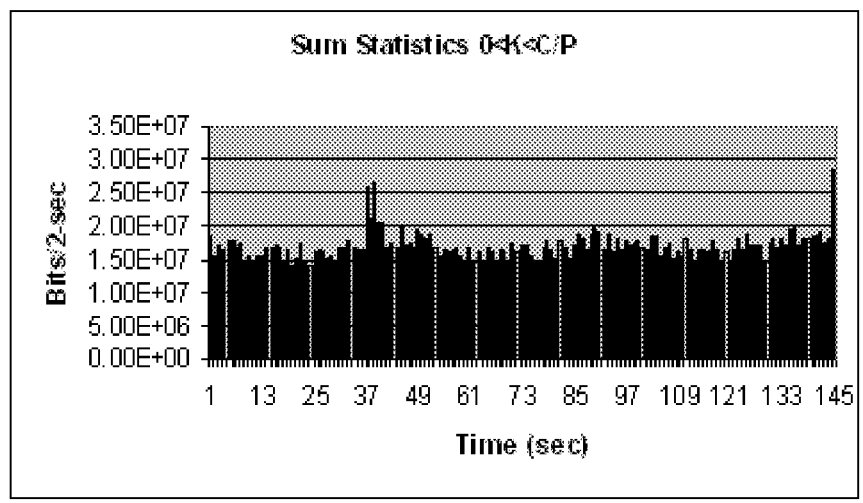
FIG. 13 is a graphic representation of sum statistics at every two second interval.
Figure 14:
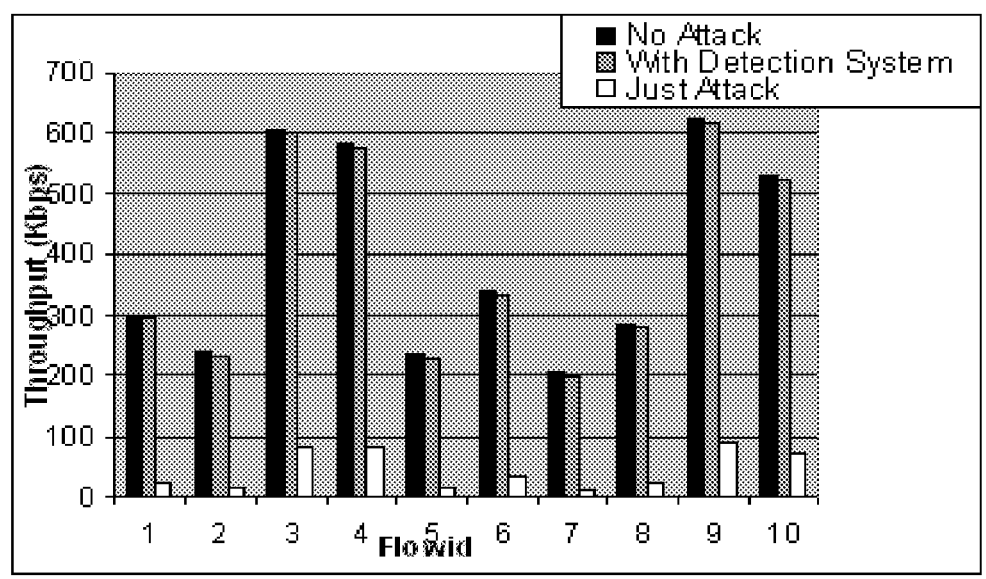
FIG. 14 is a graphic representation of throughput values of the legitimate FTP flows.
Figure 15:
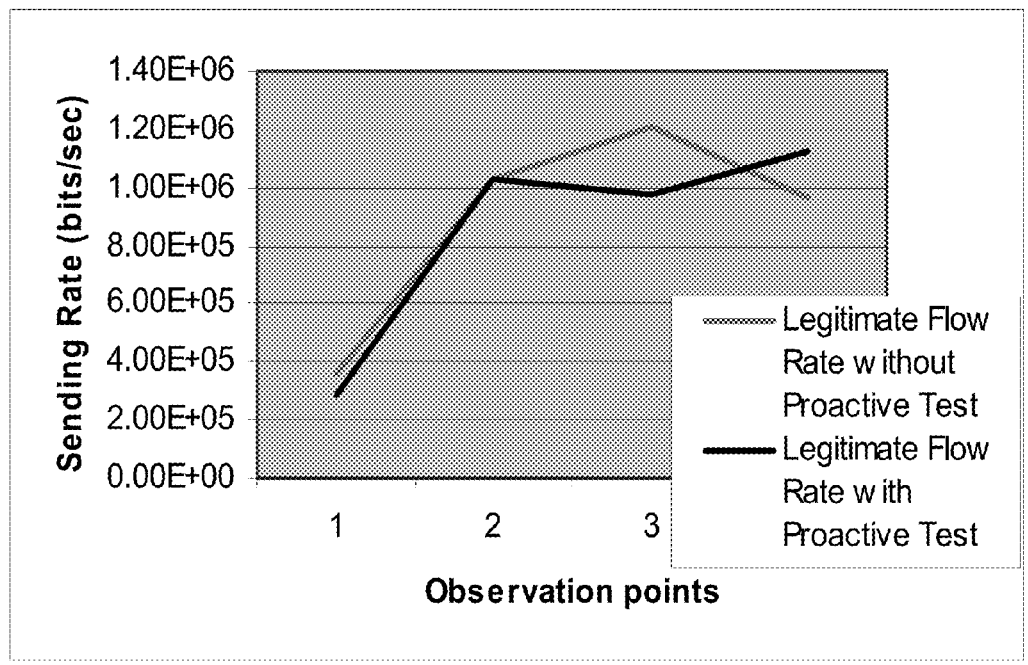
FIG. 15 is a graphic representation of exemplary observation points and sending rates where a bottleneck is 10 Mbps and CBRs are sent at 10 Mbps

Evaluations of the low rate DoS attack detection algorithm using Internet traces provided by CAIDA were conducted in accordance with the described embodiments. The flow information was obtained from the traces using the coralreef software. The low rate DoS attack detection algorithm was then executed on the flow information. The results indicating the nature of the SUM variable are shown in FIGS. 12 and 13. In FIG. 13, the burst period of the attack is two seconds and in FIG. 12 the burst period is one second to verify the validity of the proposed thresholds to detect the low rate DoS attack. The low rate DoS attack with burst periods greater than one second can be easily mitigated by several AQM schemes like RED-PD. For the OC48 (C=2.5 Gbps) speed, C/2 is 1.25 Gbps, and C/4 is 625 Mbps. FIGS. 12 and 13 show that the sum variable is around 5 to 15 Mbps which is less than both C/2 and C/4. Thus, the presently described low rate DoS attack detection algorithm can detect a low rate DoS attack which employs IP address spoofing. Preliminary investigations using the ns2 simulator validate the proposed detection and mitigation system. A dumbbell topology network with a single bottleneck link of 10 Mbps was used. The access links were 100 Mbps with random delays on each link to simulate varying roundtrip-time for each connection. Ten FTP flows and one attack flow were used in the network. The FTP traffic used TCP sack with a window size of 43 packets, segment size 1460 bytes, and the other parameters were default values. The attack flow was an UDP constant bit rate traffic with the burst period of 0.4 seconds, the burst rate 15 Mbps, and the time period one second. The attack traffic was using random IP address spoofing. In the ns2 simulations, puzzles could not be served before the connections were established, and so it was assumed that the FTP connections had solved the puzzles. FIG. 14 shows the throughput of legitimate FTP flows under different scenarios. Note that by using the detection and mitigation system the throughput is restored. FIG. 15 shows the sending rate of a legitimate flow with and without the proactive test, respectively. Typically, the legitimate flow that uses a stock TCP should reduce its rate after its packet is dropped. An attack flow does not obey the stock protocol which was shown in the original PTDT. An exemplary embodiment includes an augmentation of the PTDT approach with the low rate DoS attack detection algorithm to mitigate the low rate DoS attacks orchestrated through botnets.

Embodiments described herein provide a detection system to detect new breed of DoS attacks in the Internet known as low rate DoS attacks. In actual tests, this detection system has been shown to detect and mitigate these attacks even if an attacker uses IP address spoofing.

At least one exemplary method offers significant advantages relative to prior art. The advantageous properties and/or characteristics of the disclosed method include, but are not limited to, scalability and the fact that it is highly suitable at edge networks for the interactive web traffic (i.e., http traffic) in the Internet.

The applicant has attempted to disclose all embodiments and applications of the disclosed subject matter that could be reasonably foreseen. However, there may be unforeseeable, insubstantial modifications that remain as equivalents. While the embodiments have been described in conjunction with specific, exemplary embodiments thereof, it is evident that many alterations, modifications, and variations will be apparent to those skilled in the art in light of the foregoing description without departing from the spirit or scope of the present disclosure.

What is claimed is:

1. A system comprising:
memory;
a processor, communicatively coupled to the memory and configured to:
receive communication flow information from incoming packets to a router on a network;
detect a low rate denial of service (DoS) attack if a total number of bytes of expired flows in a communication flow received at the router exceeds a detection threshold, wherein the detection threshold is greater than or equal to C+B, where C is a link capacity and B is a router buffer size; and
in response to detection of the attack, activate a proactive test-based differentiation technique (PTDT) module,
wherein the PTDT module is configured to admit a communication flow into the network based on a pass counter, wherein the pass counter indicates a number of times the communication flow is found to reduce a communicate rate in response to the PTDT module dropping a packet in the communication flow.

2. The system of claim 1, wherein the PTDT module is further configured to communicate a puzzle to an originator of a new communication flow, wherein the puzzle is configured to ascertain whether the communication packet originated by human control.

3. The system of claim 2, wherein the puzzle comprises a CAPTCHA test.

4. The system of claim 1, wherein the new communication flow is identified by a synchronize (SYN) packet.

5. The system of claim 1, wherein the PTDT module increments a fail counter when the communication flow from which the PTDT module drops a packet and does not respond to loss of the packet by reducing the communication rate.

6. The system of claim 5, wherein the PTDT module drops the communication flow from the network when the fail counter reaches a fail threshold.

7. The system of claim 1, wherein the processor is further configured to estimate flow size of received incoming packets.

8. An apparatus comprising:
means for detecting a low rate denial of service (DoS) attack configured to receive communication flow information from incoming packets to a router on a network and detect a DoS attack if a total number of bytes of expired flows in a communication flow received at the router exceeds a detection threshold, wherein the detection threshold is greater than or equal to C+B, where C is a link capacity and B is a router buffer size; and
means for performing a proactive test-based differentiation technique (PTDT) configured to admit a communication flow into the network based on a pass counter, wherein the pass counter indicates a number of times the communication flow is found to reduce a communicate rate in response to the PTDT dropping a packet in the communication flow,
wherein the means for detecting a low rate DoS attack is further configured to, in response to detecting the DoS attack, activate the means for performing the PTDT.

9. The apparatus of claim 8, wherein the means for performing the PTDT is further configured to communicate a puzzle to an originator of a new communication flow, wherein the puzzle is configured to ascertain whether the communication packet originated by human control.

10. The apparatus of claim 9, wherein the new communication flow is identified by a synchronize (SYN) packet.

11. The apparatus of claim 8, wherein the means for performing the PTDT increments a fail counter when the communication flow from which the means for performing a PTDT drops a packet and does not respond to loss of the packet by reducing the communication rate.

12. The apparatus of claim 11, wherein the means for performing the PTDT drops the communication flow from the network when the fail counter reaches a fail threshold.

13. A non-transitory computer readable medium having computer-readable instructions stored thereon for execution by a computer system, wherein the instructions comprise:

instructions to detect a low rate denial of service (DoS) attack by receiving communication flow information from incoming packets to a router on a network and to determine if a total number of bytes of expired flows in a communication flow received at the router exceeds a detection threshold, wherein the detection threshold is greater than or equal to C+B, where C is a link capacity and B is a router buffer size; and instructions to perform a proactive test-based differentiation technique (PTDT) configured to admit a communication flow into the network based on a pass counter, wherein the pass counter indicates a number of times the communication flow is found to reduce a communicate rate in response to the PTDT dropping a packet in the communication flow, wherein the PTDT is performed in response to detection of the low rate DoS attack.

14. The computer readable medium of claim 13, wherein the PTDT further includes communication of a puzzle to an originator of a new communication flow, wherein the puzzle is configured to ascertain whether the communication packet originated by human control.

15. The computer readable medium of claim 14, wherein the new communication flow is identified by a synchronize (SYN) packet.

16. The computer readable medium of claim 13, wherein the PTDT increments a fail counter when the communication flow from which the PTDT drops a packet and does not respond to loss of the packet by reducing the communication rate.

17. The computer readable medium of claim 16, wherein the PTDT drops the communication flow from the network when the fail counter reaches a fail threshold.

* * * * *